US012765978B2

(12) United States Patent
Fischler et al.

(10) Patent No.: US 12,765,978 B2
(45) Date of Patent: Oct. 20, 2026

(54) GINGIVA FORMER, BITE SUPPORT AND DENTAL HEALING SYSTEM

(71) Applicant: INSTITUT STRAUMANN AG, Basel (CH)

(72) Inventors: Titus Fischler, Zeiningen (CH); Felix Fischler, Hagenthal le Haut (FR)

(73) Assignee: INSTITUT STRAUMANN AG, Basel (CH)

( * ) Notice: Subject to any disclaimer, the term of this patent is extended or adjusted under 35 U.S.C. 154(b) by 221 days.

(21) Appl. No.: 17/055,196

(22) PCT Filed: May 14, 2019

(86) PCT No.: PCT/EP2019/062280
§ 371 (c)(1),
(2) Date: Nov. 13, 2020

(87) PCT Pub. No.: WO2019/219641
PCT Pub. Date: Nov. 21, 2019

(65) Prior Publication Data
US 2021/0220095 A1 Jul. 22, 2021

(30) Foreign Application Priority Data
May 16, 2018 (CH) .................................... 00622/18

(51) Int. Cl.
*A61C 13/265* (2006.01)
*A61C 8/00* (2006.01)

(52) U.S. Cl.
CPC ........ *A61C 13/2656* (2013.01); *A61C 8/0001* (2013.01); *A61C 8/0048* (2013.01); *A61C 8/008* (2013.01)

(58) Field of Classification Search
CPC ....... A61C 8/00; A61C 8/0001; A61C 8/0037; A61C 8/0048; A61C 8/005; A61C 8/0059;
(Continued)

(56) References Cited

U.S. PATENT DOCUMENTS 5,195,891 A * 3/1993 Sulc ..................... A61C 8/0069 433/173
5,810,592 A * 9/1998 Daftary .................. A61C 8/008 433/172
(Continued)

FOREIGN PATENT DOCUMENTS

ES 2169689 A1 7/2002
FR 3067587 A1 * 12/2018 ........... A61C 8/0001
(Continued)

OTHER PUBLICATIONS

Augthun Michael, WO-2015165640 English Translation, Jun. 2023, Description (Year: 2023).*
(Continued)

*Primary Examiner* — Edward Moran
*Assistant Examiner* — Christine L Nelson
(74) *Attorney, Agent, or Firm* — MEDLER FERRO WOODHOUSE & MILLS PLLC

(57) ABSTRACT

A gingiva former is disclosed having an implant fixing structure configured to fix the gingiva former to an implant construction fixed to a jaw of a patient, and an emergence profile portion configured to be positioned within a gingiva of the patient when the gingiva former is mounted to the implant construction. The gingiva former further includes a mounting structure configured to connect an intermediate element to the gingiva former such that the intermediate element extends towards an oral cavity of the patient when the gingiva former is mounted to the implant construction.
(Continued)

The mounting structure has a clipping geometry configured to snap-fit with a corresponding clipping structure of the intermediate element to temporarily mount the intermediate element to the gingiva former.

13 Claims, 5 Drawing Sheets

(58) Field of Classification Search
CPC ... A61C 8/0062; A61C 8/0066; A61C 8/0074; A61C 8/0075; A61C 8/0077; A61C 8/008; A61C 8/0083; A61C 13/2656; A61C 2204/005; A61C 8/006; A61C 8/0078; A61C 13/265
USPC .................................................. 433/173, 174
See application file for complete search history.

(56) References Cited

U.S. PATENT DOCUMENTS

| | | | | | |
|---|---|---|---|---|---|
| 5,904,483 | A * | 5/1999 | Wade | A61C 8/0048 | 433/214 |
| 6,394,806 | B1 * | 5/2002 | Kumar | A61C 8/0089 | 433/141 |
| 2001/0000748 | A1 * | 5/2001 | Rogers | A61C 8/0069 | 433/163 |
| 2009/0298013 | A1 * | 12/2009 | Baruc | A61C 8/0065 | 433/174 |
| 2012/0295226 | A1 * | 11/2012 | Robb | A61C 8/008 | 433/201.1 |
| 2014/0011160 | A1 * | 1/2014 | Jorneus | A61C 8/0078 | 433/173 |
| 2014/0162211 | A1 | 6/2014 | Mullaly et al. | | |
| 2015/0182309 | A1 * | 7/2015 | Soler | A61C 8/0083 | 433/201.1 |
| 2018/0049849 | A1 * | 2/2018 | Lamar | A61C 8/001 | |
| 2018/0235736 | A1 * | 8/2018 | Lee | A61C 8/0062 | |
| 2018/0338818 | A1 * | 11/2018 | Sarig | A61C 8/005 | |
| 2019/0029779 | A1 * | 1/2019 | Vonwiller | A61C 8/0054 | |
| 2019/0247153 | A1 * | 8/2019 | Zipprich | A61C 8/0066 | |

FOREIGN PATENT DOCUMENTS

| | | | | |
|---|---|---|---|---|
| FR | 3067588 | A1 * | 12/2018 | A61C 13/0001 |
| FR | 3067589 | A1 * | 12/2018 | A61C 13/0001 |
| KR | 100755940 | B1 | 9/2007 | |
| WO | WO-2015165640 | A1 * | 11/2015 | A61C 8/0001 |
| WO | 2016012581 | A1 | 1/2016 | |
| WO | WO-2018234247 | A1 * | 12/2018 | A61C 13/0001 |

OTHER PUBLICATIONS

FR-3067587-A1 Translation, Dec. 7, 2023, Description (Year: 2023).*
FR-3067588-A1 Translation, Dec. 7, 2023, Description (Year: 2023).*
FR-3067589-A1 Translation, Dec. 7, 2023, Description (Year: 2023).*
Calvat et al., WO-2018234247 English translation, Description (Year: 2022).*
AT-Machining, A Comprehensive Guide to Effective Snap Fit Design Jul. 2, 2023. Accessed Jul. 1, 2024 https://at-machining.com/snap-fit-design/#:~:text=A%20snap%2Dfit%20joint%20design,depression)%20to%20form%20an%20assembly. (Year: 2023).*
International Search Report issued Jul. 31, 2019 in Intl. Appln. No. PCT/EP2019/062280.

* cited by examiner

GINGIVA FORMER, BITE SUPPORT AND DENTAL HEALING SYSTEM

TECHNICAL FIELD

The present invention relates to a gingiva former according to the preamble of independent claim 1 and more particularly to a bite support and a dental healing system. Such gingiva former, which can be fixed to an implant set to a jaw, has an emergence profile portion configured to be positioned in a gingiva. It can be used for allowing a proper healing of the gingiva while the implant grows in the jaw. Particularly, by means of such a gingiva former, the gingiva channel can be shaped (soft tissue conditioning) such that at a later step a restoration can be conveniently mounted to the implant, e.g. via an abutment, without harming the gingiva and to assist best possible healing.

BACKGROUND ART

Today, implant-supported dental prostheses often are the treatment of choice when a patient needs to have one tooth or a multiplicity of teeth substituted in a way that the outcome is a natural-feeling, stable restoration, especially if certain clinical conditions, such as healthy underlying bone and soft tissue structures, are to meet.

Dental implants normally take the form of threaded elements which are engineered to be placed into the jaw of a patient. Implant placement typically requires the opening of gingiva flaps in order to better access the implantation area. Irrespective of whether a submucosal approach or a transmucosal approach is followed, that is of whether a double-staged surgical intervention or a single-stage flap-opening is performed on the soft tissue of the gingiva, a so called healing cap or healing abutment, also more generally designated as gingiva former, is typically mounted to the inserted implant. The function of the healing cap or abutment is to preserve and retain in place the gingival tissue in the implantation site, i.e., in the area around the socket of the missing tooth, thereby preserving an anatomic emergence profile.

The temporary use of healing caps or healing abutments is intended to create the wished shape of emergence profile deemed suitable for the given patient situation. Such shaping of the gingiva is also summarized, in the technical filed of implantology, as soft tissue conditioning.

Typically, in dental restoration treatments, further processes or steps in addition to implant healing and soft tissue conditioning are involved. For example, it is often desired to design and build the dental restoration in accordance with the given situation in a patient's mouth. For that purpose, either the situation at hand is scanned by an intra oral scanner or a model casting by means of an impression taken in the mouth is made. Both processes usually require that the healing cap or abutment is removed and appropriate other elements such as scan bodies or bite supports are temporarily mounted to the implant. Afterwards, the healing cap or abutment may again be mounted to the implant again while generation of the restoration is proceeded. Often, within the dental technical process performed for generating a suiting restoration, plural auxiliary element have to be connected to the implant one after another.

However, removing and eventually re-mounting the healing cap or abutment may cause stress to the soft tissue and may also affect the healing of the implant into the jaw. This is particularly the case since the healing cap or abutment typically is grabbed from outside to remove it such that—to a certain extent—the soft tissue around the healing cap or abutment has to be removed, shifted or lifted. In each removal and re-mounting there is a risk of injuring the gingiva and/or of weakening or repositioning the implant-jaw connection.

Therefore, there is a need for a device or a system allowing a gentle handling of the soft tissue and implanting situation when an individual restoration is designed and generated suiting to the given situation in a patient's mouth.

DISCLOSURE OF THE INVENTION

According to the invention this need is settled by a gingiva former as it is defined by the features of a first independent claim, by a bite support, and by a dental healing system as it is defined by the features of a second independent claim. Preferred embodiments are subject of the dependent claims.

In particular, in one aspect the invention is a gingiva former comprising an implant fixing structure, an emergence profile portion and a mounting structure.

In the context of the present invention, the term "gingiva former" relates to an element or device designed to be arranged onto an implant construction during healing, after insertion of the implant construction, for the purpose of soft tissue conditioning. It can be shaped to reflect the form of the gingiva channel through which the implant construction is inserted after surgical opening of a flap in the gingiva. Possible types of gingiva formers include healing caps, healing abutments and similar elements.

The implant construction can comprise one or more implants in the more literal sense being a post-like element inserted as artificial root into the jaw bone. It can also comprise an abutment or base affixed to the implant or fixed to at least one remainder of an original tooth. For instance, the implant construction can comprise a base abutment, e.g. in titanium, which is designed to be placed into an implant to provide support for dental restorations, or prosthetic reconstructions, such as crowns or bridges.

The term "dental restoration" in context of the present invention relates to a structure that comprises a visible portion extending into the oral cavity such as one or plural artificial teeth. The term covers crowns, bridges and the like, as well as also similar restorations. The dental restoration typically is individually formed in consideration of the situation give in the oral cavity where it will be placed. Thus, the restoration in accordance with the invention can particularly be a patient specific individual restoration.

The term "jaw" is understood herein as comprising the jaw bone, the associated soft tissue as well as the teeth together with the roots.

The implant fixing structure of the gingiva former is configured to mount the gingiva former to the implant construction which is fixed to a jaw of a patient. Particularly, such implant fixing structure can be designed to directly interact with a corresponding structure of the implant construction. For example, the implant fixing structure of the gingiva former can have a screw shaft and the implant as corresponding screw socket. The implant fixing structure can also be designed to cooperate with an additional element in order to mount the gingiva former to the implant. For example, as explained in more detail below, it can be designed as a screw recess accommodating a screw which is screwed into a socket of the implant for mounting the gingiva former to the implant.

The emergence profile portion of the gingiva former is configured to be positioned within a gingiva of the patient when the gingiva former is mounted to the implant construction. Thereby, it can have an outer surface shape which smoothly adapts to the natural emergence profile given at the situation in the mouth of the patient. Or, it can have an outer surface shape which is shaped to design an aimed and preferred target emergence profile in the gingiva at the end of the soft tissue healing. At the end, the shape of the emergence profile portion advantageously corresponds to an emergence profile section of the dental restoration, i.e. a portion of the restoration to be positioned adjacent to, or surrounded by, the gingiva in use of the restoration.

The mounting structure of the gingiva former is configured to connect an intermediate element to the gingiva former such that the intermediate element extends towards an oral cavity of the patient when the gingiva former is mounted to the implant construction. Thereby, the mounting structure comprises a clipping geometry configured to snap-fit with a corresponding clipping structure of the intermediate element to temporarily mount the intermediate element to the gingiva former.

The intermediate element can be any structure or device required or useful for generating the dental restoration or any other desired purposes. For example, as described in more detail below, it can be a scan body, a bite support, an impression post, a restoration such as a bridge or a crown, or a similar element.

The term "snap-fit" as used herein can relate to a form-fitting and releasable connection. Thereby, the connection or retention force can be mainly defined by interlocking the clipping geometry and the corresponding clipping structure. Additionally, it can be assisted by friction and/or clamping forces acting between these parts. For example, snap-fit is involved in known snap fastener connections or press button connections. Also in dental applications, similar connections are known. For example, it is known to connect a dental restoration on an implant or abutment by snap-fitting a matrice element of the restoration on a patrice of the implant. In such systems, the connection may consist of a female housing merged in the restoration and a male head embodied on the implant or abutment. Prior connecting the restoration with the implant, an appropriate retention insert is placed in the female housing which allows an elastic snapping on the head. Thereby, the retention force can be adjusted by selecting a suitable retention insert. For example, such a system is described in WO 2011/027229 A1.

By equipping the gingiva former with a mounting structure shaped for a snap-fit connection it can be achieved that any desired intermediate element can be clipped on the gingiva former while it is mounted to the implant construction. This allows for connecting the intermediate element with the implant construction without requiring to remove the gingiva former. Thereby, the risk of harming the gingiva or the bone healing, or of shifting the implant construction can be lowered or even eliminated. Additionally, such clipping connection allows for a convenient and quick mounting and de-mounting. Thus, the gingiva former according to the invention allows for a gentle handling of the gingiva and implanting situation when the restoration is designed and generated.

The clipping geometry of the mounting structure of the gingiva former and the corresponding clipping structure of the intermediate element can be embodied as corresponding male and female portions. In particular, whereas the clipping geometry of the mounting structure can also be a male portion, it preferably is configured as female portion of a clipping connection. Correspondingly, the clipping structure of the intermediate element preferably is embodied as male portion of the clipping connection. The term "clipping connection" in this context relates to a holding of the intermediate element to the gingiva former by snap-fitting these parts together. Embodying the clipping geometry as female portion allows for an efficient implementation of the gingiva former and a convenient and safe application or mounting of the intermediate element. In some embodiments, an elastic retention insert can be used for adjusting the force of the clipping connection. In particular, the retention insert can be inserted in the female portion before being connected to the male portion.

Preferably, the mounting structure comprises a socket with an aperture and a rounded circumferential sidewall section. Such a socket allows for conveniently introducing the corresponding clipping structure of the intermediate element. The circumferential rounded sidewall section allows for providing an efficient and safe snap-fit connection between the intermediate element and the gingiva former.

Thereby, the rounded circumferential sidewall section of the socket of the mounting structure preferably is concave. Such concave shape allows for efficiently receiving a corresponding convex portion in order to establish interlocking or form-fitting.

In a preferred embodiment, the mounting structure comprises at least one further connection geometry in addition to the clipping geometry which is configured to temporarily mount a further intermediate element to the gingiva former. By having such further connection geometry or even additional further respective connection geometries, the gingiva former can be advantageous in assisting appropriate applications of required steps for generating the dental restoration or for treatment. In particular, such further connection geometry allows for providing suitable connections to a desired need. For example, in one specific step of the dental restoration treatment, it can be desired to have an element more strongly connected to the implant construction than by snap-fitting such that the further connection geometry may allow for a more solid mounting.

Having the gingiva former with the connection geometry and additionally with at least one further connection geometry allows for providing plural connections to the gingiva former which can be chosen in application or use as suiting best. Like this, the gingiva former can be a multi-functional connector suitable for different kinds of connections. This might be beneficial when it is desired to use plural intermediate elements with the same gingiva former which already have different mounting structures or which requires different connection conditions.

The at least one further connection geometry preferably comprises a thread structure configured to screw the further intermediate element to the gingiva former. The thread may allow for providing a comparably strong connection to the implant construction or gingiva former. Even though, the connecting itself may be somehow less efficient and more time consuming than clipping, screwing might be a more spread connection technique. For example, the thread might be used for a release instrument used to smoothly remove the gingiva former from the implant construction before attaching the dental restoration.

The thread structure preferably comprises an internal thread arranged in the socket. Such thread structure might be efficiently used for connecting an intermediate element having a corresponding outer thread. Thereby, the internal thread of the thread structure preferably is axially distinct from the rounded sidewall. Like this, the different connection geometries can efficiently be separated from each other such that no or only limited restrictions are involved when designing the single geometries.

Preferably, the implant fixing structure comprises a bore with a head section and a shank section configured to receive a screw such that a shank of the screw extends through the shank section of the bore and a head of the screw abuts the head section of the screw when the screw is driven into the implant construction for fixing the gingiva former to the implant construction. Such an implant fixing structure allows for efficiently and securely mounting the gingiva former to the implant construction by means of a screw. Thereby, the regular connection structure of the implant construction can also be used for mounting the gingiva former.

Preferably, the implant fixing structure is located at an apical end region of the gingiva former and the mounting structure is located at another end region opposite to the implant fixing structure. Thereby, the implant fixing structure can particularly be at an apical end of the gingiva former and the mounting structure at or near an occlusal end of the gingiva former.

The term "apical" as used herein relates to a direction towards an apex of the tooth or implant. The term "occlusal" relates to a usually more or less opposite direction towards a grinding or biting surface of the teeth.

Preferably, the mounting structure comprises an indexing formation configured to index the orientation of the intermediate element when connected to the gingiva former. Such indexing formation allows for connecting intermediate elements to the gingiva former for which the orientation in relation to the implant and/or jaw is of importance. For example, such orientation is crucial when using a scan body in order to exactly know how the orientation of the scan body in relation to the implant construction is.

Thereby, an orientation relative to the jaw can be determined with reference to neighbouring teeth, to the jaw bone, or, particularly in cases where no teeth are available, to the soft tissue structure. The orientation relative to the jaw can also encompass spatial information relative to the occlusal surfaces opposing to the site of implant placement and of dental restoration placement. In this context, indexing can relate to the process of recording the position of implants relative to adjacent teeth and the antagonist teeth at the time of implant surgery. The purpose of indexing is to register the position of the implant in a way that a laboratory technician or a computer aided design (CAD) operator can generate correctly oriented models for the fabrication of abutments and/or crowns to be supported by the same implant. Dental restorations such as abutments and/or crowns typically comprise anti-rotational features, such as protrusions, shaped to match respective anti-rotational features, such as notches, of the implants by which they are to be retained, so that the relative spatial relationship remains locked.

In another aspect, the invention is a bite support for supporting a relation of jaws to each other while determining a given occlusion. The bite support comprises a gingiva former mounting at an apical end region and a receptacle at an occlusion end region configured to receive a mass for adjusting a vertical dimension of occlusion.

The bite support can be used to stabilize the relation of the jaws while taking the correct occlusion in order to ensure the correct register of the occlusion and to help the dental technician lab to put the model together after casting.

Particularly, in situations where plural neighboring teeth or a complete section of a dentition is to be restored, impression coping for generating a model often is comparably difficult since the jaws do not have a natural restriction of occlusion in the section of restoration. When impression coping the jaws are typically moved towards each other until the mouth is closed. In situations where no natural resistance of this closing movement is present, the jaw might be slightly bent such that an over-movement is impression coped. Having in mind, that very small deviations compared to the natural occlusion may cause severe discomfort or health problems already, it is aimed to have the vertical dimension of occlusion as accurate as possible in order to achieve a precise impression coping. For that purpose, it is known to adhere assisting elements to the healing caps or abutments which limit the biting movement. However, such procedure is comparably cumbersome and prone to imperfection by miss-handling. Also, the gingiva former usually is impaired by sticking the assisting element to it such that it has to be removed after impression coping.

In this context, the bite support according to the invention allows for temporarily providing a limit of the biting movement. In particular, by having the receptacle at its occlusal end, the respective mass can be brought at a target location for limiting the biting movement. Thus, a comparably accurate process can be achieved with a completely removable set-up.

The mass for adjusting a vertical dimension of occlusion can be can be silicone such as a bite stone material. For example, such material can be an addition-vulcanizing silicone on an elastomer basis with a high final hardness such as of 51 Shore D.

Preferably, the gingiva former mounting of the bite support comprises a clipping structure configured to snap-fit with a corresponding clipping geometry of a gingiva former as described above to temporarily mount the bite support to the gingiva former. Such a clipping structure allows for efficiently, securely and accurately positioning the bite support in the mouth of the patient. Also removal of the bite support after impression coping is conveniently possible.

Thereby, the clipping structure preferably is configured as male portion of a clipping connection. Such male portion allows for an efficient setting in a corresponding female portion of the gingiva former.

The gingiva former mounting preferably comprises a punch with a rounded circumferential sidewall section and a flat apical end. Such punch can be head-like shaped and can form an efficient embodiment of a male portion. Thereby, the rounded circumferential sidewall section of the punch of the gingiva former mounting preferably is convex.

Preferably, the gingiva former mounting comprises an indexing formation configured to index the orientation of the bite support when connected to the gingiva former.

A further other aspect of the invention is a dental healing system comprising a gingiva former as described above and at least one intermediate element. Such system preferably having plural intermediate elements allows providing convenient kit with all necessary parts requires in place or in the patient's mouth for generating the dental restoration.

Preferably, the at least one intermediate element comprises a bite support as described above or a plurality of such bite supports in order to provide a variety of sizes.

Further, the at least one intermediate element of the dental healing system preferably comprises a scan body having a gingiva former mounting at an apical end region and a geometric formation configured to be scanned by an intra oral scanning device such that the orientation of the scan body is determinable at a occlusal end region of the scan body. The at least one intermediate element can further comprise an impression post and/or a restoration such as a bridge or a crown.

BRIEF DESCRIPTION OF THE DRAWINGS

The dental healing system according to the invention, the gingiva former according to the invention and the bite support according to the invention are described in more detail herein below by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes includes various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
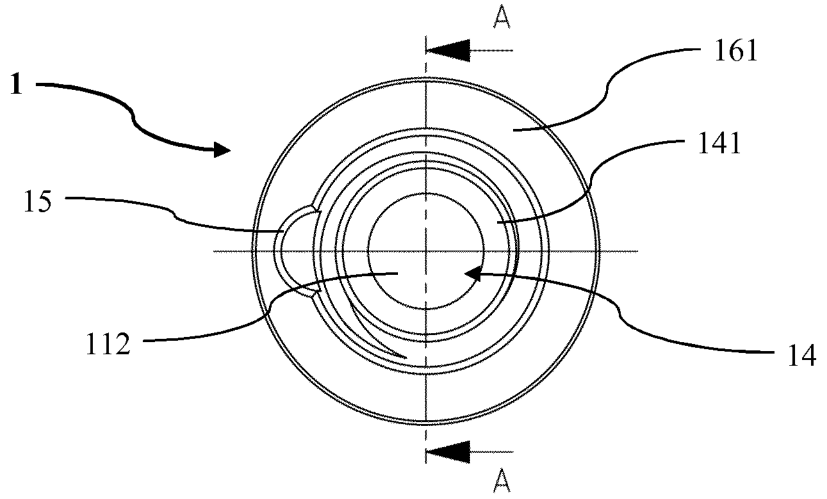
FIG. 1 shows a top view on an embodiment of a gingiva former according to the invention of an embodiment of a dental healing system according to the invention.

FIG. 1 shows a top view on an embodiment of a gingiva former 1 according to the invention of an embodiment of a dental healing system according to the invention. The gingiva former 1 has a circular outer circumference and a central through hole or channel extending in an axial direction of the gingiva former 1. The through hole is shaped to embody different functional features to the gingiva former 1. In particular, the through hole is designed to form a socket 14 with an aperture 141 at an occlusal end 161, a central apically ending shank section 112 and an indexing recess 15.

Figure 2:
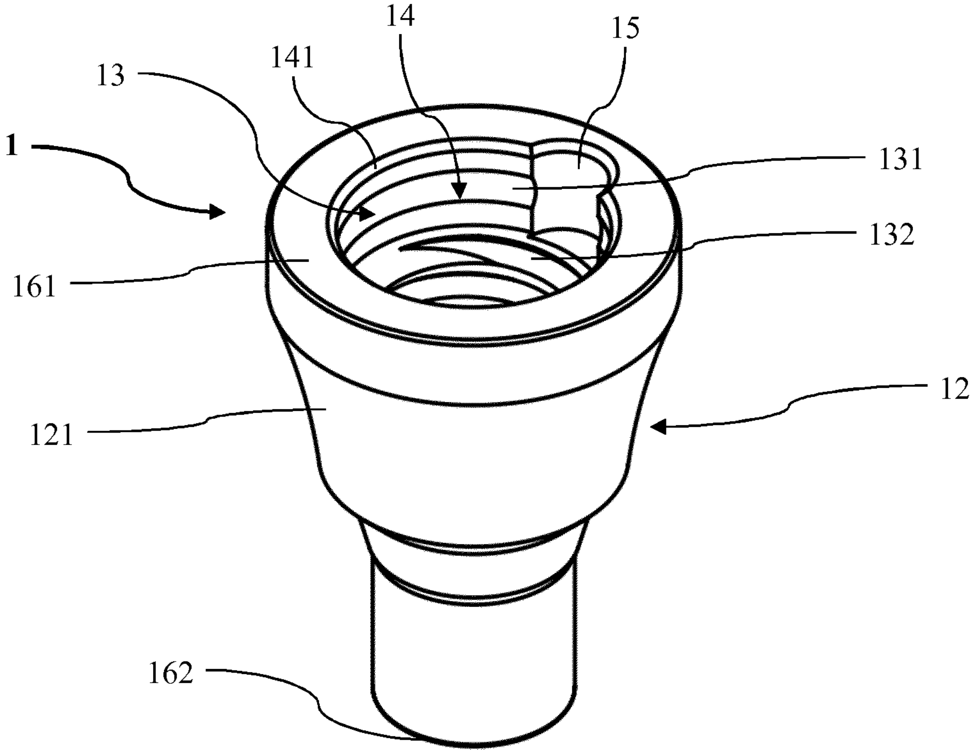
FIG. 2 shows a perspective view of the gingiva former of FIG. 1.
Figure 3:
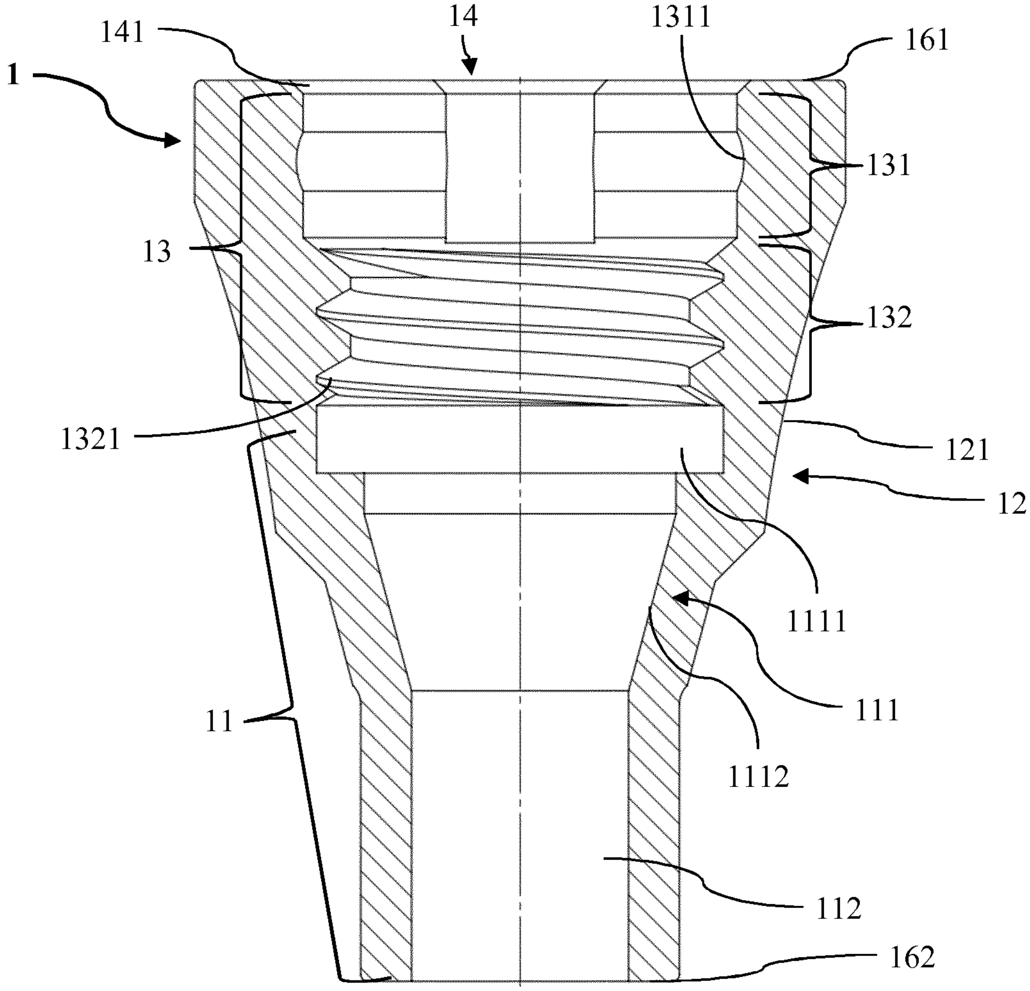
FIG. 3 shows a cross-sectional view along the line A-A of the gingiva former of FIG. 1.

As can be better seen in FIG. 2 and FIG. 3, perspectively and cross-sectionally depicting the gingiva former 1, the through hole extends axially through the complete gingiva former 1 and establishes a mounting structure 13 and the indexing recess 15 axially adjacent to the occlusal end 161 as well as an implant fixing structure 11 neighbouring the mounting structure 13 and extending to an apical end 162. The mounting structure 13 has an upper clipping geometry 131 and a lower thread structure 132. The clipping geometry 131 has a rounded concave sidewall 1311. The indexing recess 15 has the shape of a section of a cylinder and extends from the occlusal end 161 through the clipping geometry 131. The concave sidewall 1311 circumferentially extends, wherein it is interrupted by the indexing recess 15. The thread structure 132 comprises an inner thread 1321.

The implant fixing structure 11 of the gingiva former 1 has a lower cylindrical shank section 112 and an upper head section 111. The head section 111 is equipped with a conical abutting portion 1112 and a cylindrical spacer portion 1111 adjacent to the mounting structure 13. As will be described in more detail below, the implant fixing structure 11 is embodied to receive a screw 4 (not visible in FIG. 2 and FIG. 3) for fixing the gingiva former 1 to an implant.

Exteriorly, the gingiva former 1 establishes an emergence profile portion 12 which is formed by an outer surface 121. In the embodiment shown in the figures, the outer surface 121 of the emergence profile portion 12 is downwardly tapering in a slightly bent fashion. Like this, in some specific situations, the soft tissue can advantageously be prepared or formed during a healing process after setting the implant into a jaw of a patient.

Figure 4:
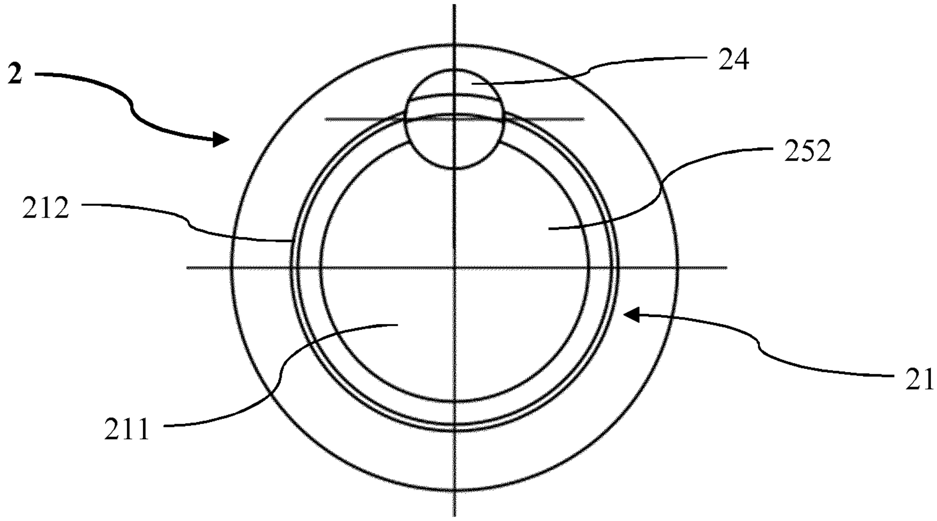
FIG. 4 shows a bottom view on an embodiment of a bite support according to the invention of the dental healing system of FIG. 1.

In FIG. 4 an embodiment of a bite support 2 according to the invention is shown as a possible intermediate element of the dental healing system of FIG. 1. In particular, FIG. 4 is a view to the bottom or an apical end 252 of the bite support 2.

The bite support 2 comprises a gingiva former mounting 21 with a central punch 211 having a rounded side wall 212 as clipping structure. A cylindrical indexing bore 24 is arranged at an outer radial end of the punch 211 such that a portion of the indexing bore 24 extends into the punch 211 and another portion not.

Figure 5:
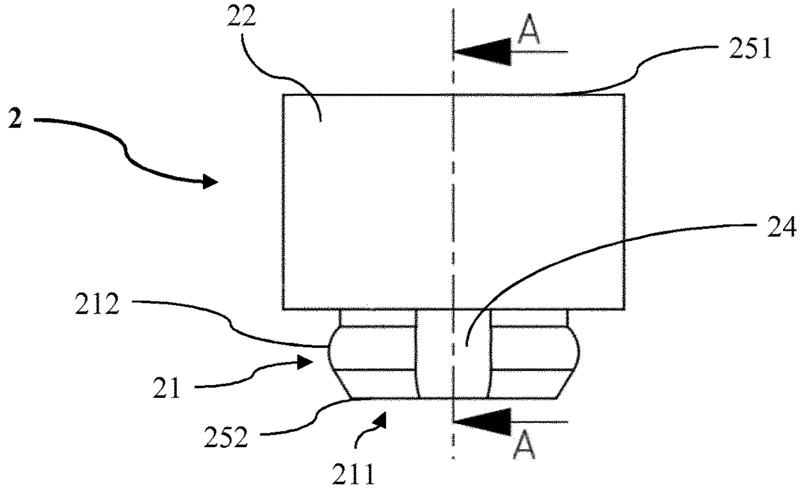
FIG. 5 shows a side view of the bite support of FIG. 4.

As can be seen in FIG. 5, the bite support 2 comprises a body 22 above the gingiva former mounting 21. The body 22 has a cylindrical outer circumference and forms an occlusal end 251 of the bite support 2. A lower portion of the indexing bore 24 is formed in the punch 211 as cylinder section. The rounded side wall 212 of the gingiva former 2 outwardly extends and, thus, is convex.

Figure 6:
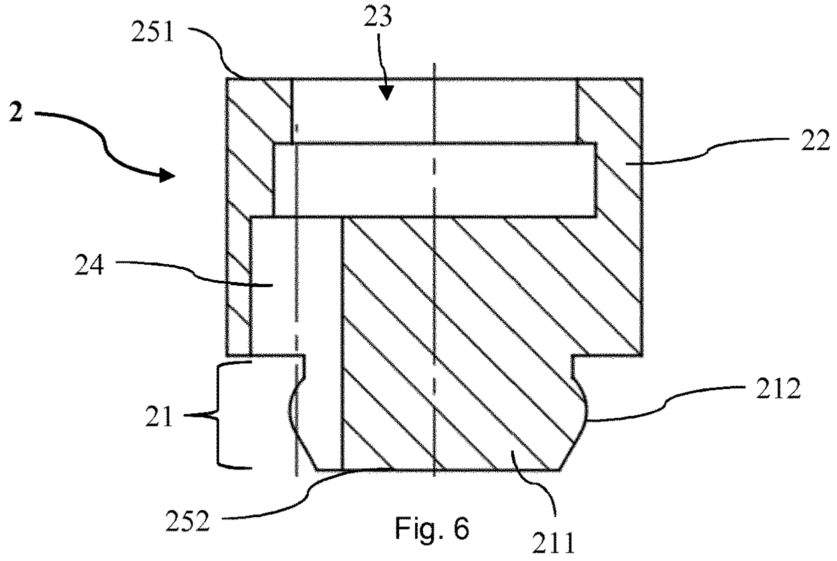
FIG. 6 shows a cross-sectional view along the line A-A of the bite support of FIG. 5.

FIG. 6 shows a cross sectional view of the bite support 2 such that the interior of the body 22 is visible. In particular, the body is equipped with in internal receptacle 23 into which, in use of the bite support 2, a mass for adjusting a vertical dimension of occlusion can be placed. Therefore, the receptacle 23 is open at the occlusal end 251 of the bite support 2. The indexing bore 24 extends downwardly from the receptacle 23 through the body 22 towards the gingiva former mounting 21. In the body 22, the indexing bore 24 is cylindrical.

Figure 7:
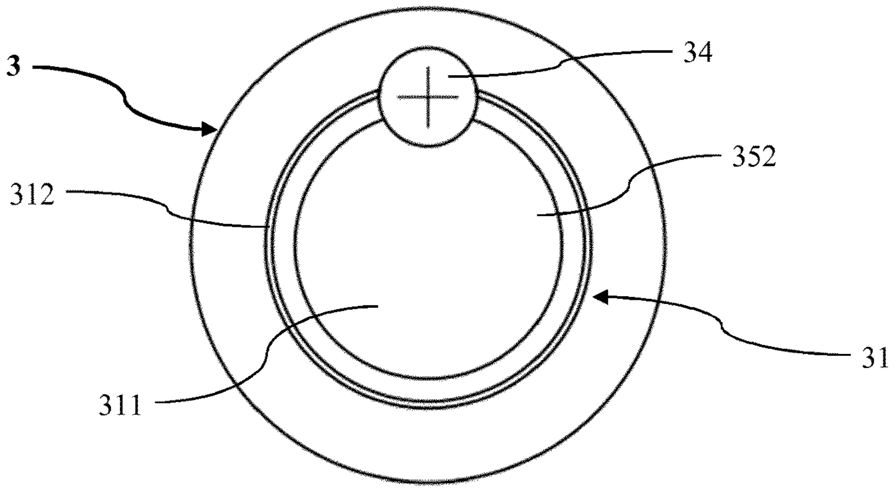
FIG. 7 shows a bottom view on an embodiment of a scan body of the dental healing system of FIG. 1.

In FIG. 7 an embodiment of a scan body 3 is shown as a further possible intermediate element of the dental healing system of FIG. 1. More specifically, FIG. 7 is a view to a bottom or an apical end 352 of the scan body 3.

The scan body 3 comprises a gingiva former mounting 31 and an indexing bore 34 analogously embodied as in the bite support 2 described above. In particular, the gingiva former mounting 31 of the scan body 3 has a central punch 311 with a rounded side wall 312 as clipping structure. The cylindrical indexing bore 34 is arranged at an outer radial end of the punch 311 such that a portion of the indexing bore 34 extends into the punch 311 and another portion not.

Figure 8:
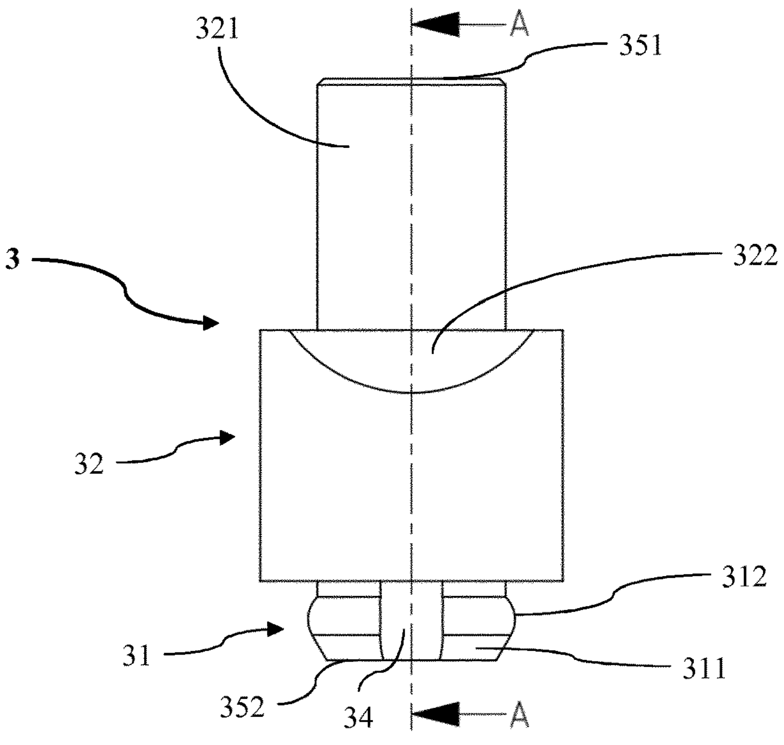
FIG. 8 shows a side view of the scan body of FIG. 7.

FIG. 8 shows that the scan body 3 comprises a body 32 above the gingiva former mounting 31. The body 32 has a cylindrical lower portion which has a flat inclined scan surface 322 axially above indexing bore 34. From where the scan surface 322 ends, a stem 321 of the body 32 upwardly extends from the lower portion of the body 32. Compared to the lower portion, the stem 321 has a reduced diameter and is arranged out of axis of the scan body 3. Un upper end of the stem 321 forms an occlusal end 352 of the scan body 3.

A lower portion of the indexing bore 34 is formed in the punch 311 as cylinder section. The rounded side wall 312 of the punch 311 of the scan body 3 outwardly extends and, thus, is convex.

Figure 9:
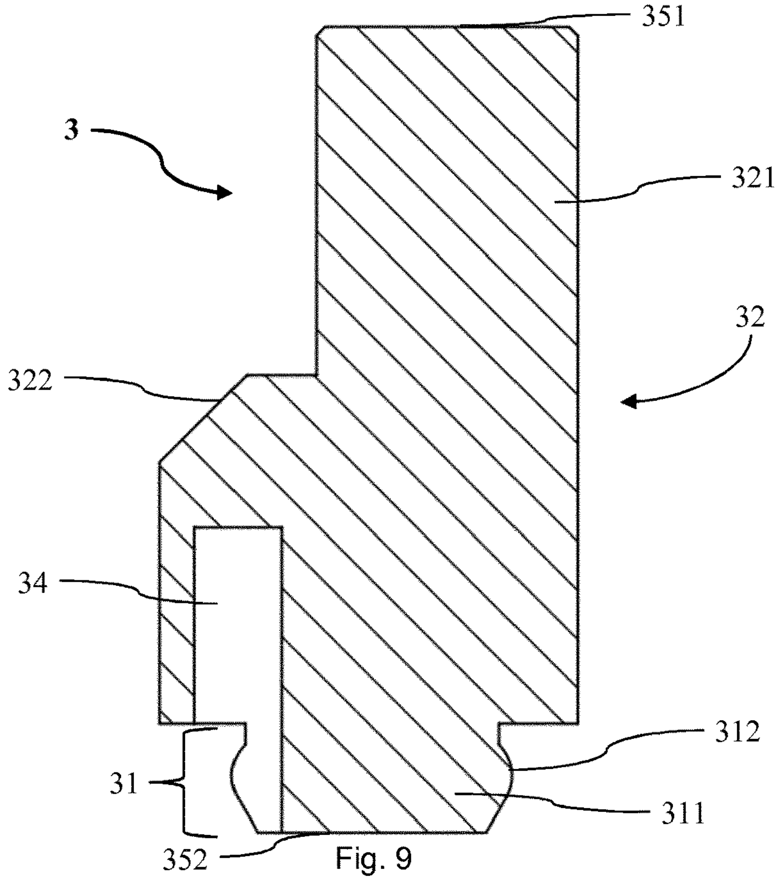
FIG. 9 shows a cross-sectional view along the line A-A of the bite support of FIG. 8.

In FIG. 9 a cross section of the scan body 3 is shown. In this Fig. it can bee seen that the body 32 is mainly solid. Only the indexing bore 34 provides a hollow cylinder extending from the gingiva former mounting 31 towards the scan surface 322. The indexing bore 34 is open at its bottom end and closed at its top end.

Figure 10:
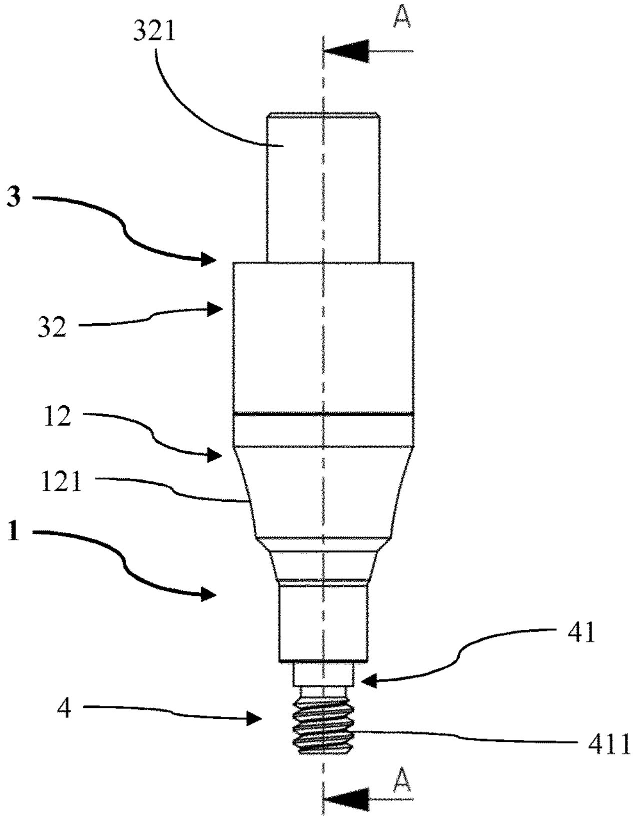
FIG. 10 shows a side view of the dental healing system of FIG. 1 in which the scan body of FIG. 7 is mounted to the gingiva former of FIG. 1.
Figure 11:
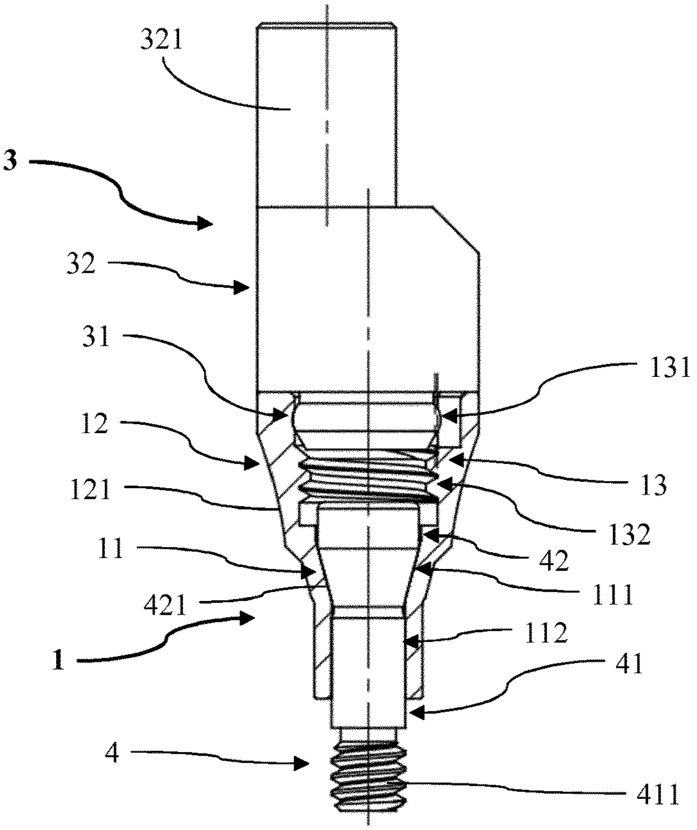
FIG. 11 shows a cross-sectional view along the line A-A of the dental healing system of FIG. 10.

FIG. 10 shows a side view and FIG. 11 a cross-sectional view of an assembly of the scan body 3 of FIG. 7 and the gingiva former 1 of FIG. 1 as well as a screw 4 provided in the gingiva former 1.

In particular, the screw 4 having an upper head 42 with a conical abutting surface 421 and a lower shank 41 having an end with an outer thread 411 is arranged in the socket of the gingiva former 1. Thereby, the head 42 is positioned in the head section 111 of the implant fixing structure 11 and an upper portion of the shank 41 in the shank section 112 of the implant fixing structure 11. The shank 41 downwardly extends out of the gingiva former 1.

In use, the outer thread 411 is screwed into a corresponding inner thread of an implant which is set in the jaw of the patient. Thereby, the abutting surface 421 of the head 42 of the screw 4 contacts the abutting portion 1112 of the head section 111 of the implant fixing structure 11. Like this, the gingiva former 1 is pressed to the implant such that it is fixed to the implant.

The scan body 3 is pushed top down onto the gingiva former 1 until the gingiva former mounting 31 of the scan body snap-fits into the clipping geometry 131 of the mounting structure 13 of the gingiva former 1. In particular, the gingiva former mounting 31 is forwarded into the clipping geometry 131 such that the convex outer surface 312 of the gingiva former mounting 31 is arranged inside and lies adjacent the concave side wall 1311 of the clipping geometry 131. Like this, a push-button like form-fit connection is established between the gingiva former 1 and the scan body 3. By means of the indexing bore 34 of the scan body 3 and the indexing recess 15 of the gingiva former 1 the orientation of the scan body 3 on the gingiva former 1 and, thus, on the implant is determined.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word “comprising” does not exclude other elements or steps, and the indefinite article “a” or “an” does not exclude a plurality. A single unit or step may fulfil the functions of several features recited in the claims. The mere fact that certain measures are recited in mutually different dependent claims does not indicate that a combination of these measures cannot be used to advantage. The terms “essentially”, “about”, “approximately” and the like in connection with an attribute or a value particularly also define exactly the attribute or exactly the value, respectively. The term “about” in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A gingiva former comprising:

an implant fixing structure comprising an axial bore with a head section and a shank section, the head section being dimensioned to receive a head of a screw to attach the gingiva former to an implant construction fixed to a jaw of a patient; and a mounting structure arranged at an occlusal end region of the gingiva former and axially occlusal of the implant fixing structure, the mounting structure comprising a socket extending axially from the occlusal end region toward the implant fixing structure, the socket comprising:

an indexing formation configured to index an orientation of an intermediate element when connected to the gingiva former, a clipping geometry configured to snap-fit with a corresponding clipping structure of the intermediate element to temporarily mount the intermediate element to the gingiva former such that the intermediate element extends towards an oral cavity of the patient when the gingiva former is mounted to the implant construction, and at least one connector, in addition to the clipping geometry, configured to temporarily mount a further intermediate element to the gingiva former, the at least one connector comprising a thread structure configured to screw the further intermediate element to the gingiva former, and the thread structure being disposed apically of the clipping geometry.

2. The gingiva former of claim 1, wherein the mounting structure comprises the socket having an aperture and a rounded circumferential sidewall section.

3. The gingiva former of claim 2, wherein the rounded circumferential sidewall section of the socket of the mounting structure is concave.

4. The gingiva former of claim 1, wherein the mounting structure comprises the socket having an aperture and a rounded circumferential sidewall section, and wherein the thread structure comprises an internal thread arranged in the socket.

5. The gingiva former of claim 4, wherein the internal thread of the thread structure is axially distinct from the rounded circumferential sidewall section of the mounting structure.

6. The gingiva former of claim 1, wherein the shank section is configured to receive the screw such that a shank of the screw extends through the shank section of the bore and the head of the screw abuts the head section of the bore when the screw is driven into the implant construction for fixing the gingiva former to the implant construction.

7. The gingiva former of claim 1, wherein the implant fixing structure is located at an apical end region of the gingiva former and the mounting structure is located at another end region opposite to the implant fixing structure.

8. The gingiva former of claim 1, further comprising an emergence profile portion configured to be positioned within a gingiva of the patient when the gingiva former is mounted to the implant construction.

9. The gingiva former of claim 1, wherein the thread structure comprises an internal thread of the gingiva former.

10. A dental healing system comprising a gingiva former according to claim 1 and at least one intermediate element.

11. The dental healing system of claim 10, wherein the at least one intermediate element comprises a bite support having a gingiva former mounting at an apical end region, and a receptacle configured to receive a mass for adjusting a vertical dimension of an occlusion at an occlusal end region.

12. The dental healing system of claim 10, wherein the at least one intermediate element comprises a scan body having a gingiva former mounting at an apical end region and a geometric formation configured to be scanned by an intra oral scanning device such that an orientation of the scan body is determinable at an occlusal end region of the scan body.

13. A dental healing system comprising:

a gingiva former;

an intermediate element; and a further intermediate element;

wherein the gingiva former comprises:

an implant fixing structure comprising an axial bore with a head section and a shank section, the head section being dimensioned to receive a head of a screw to attach the gingiva former to an implant construction fixed to a jaw of a patient; and a mounting structure arranged at an occlusal end region of the gingiva former and axially occlusal of the implant fixing structure, the mounting structure comprising a socket extending axially from the occlusal end region toward the implant fixing structure, the socket comprising:

an indexing formation configured to index an orientation of the intermediate element when connected to the gingiva former, a clipping geometry configured to snap-fit with a corresponding clipping structure of the intermediate element to temporarily mount the intermediate element to the gingiva former such that the intermediate element extends towards an oral cavity of the patient when the gingiva former is mounted to the implant construction, and at least one connector, in addition to the clipping geometry, configured to temporarily mount the further intermediate element to the gingiva former, the at least one connector comprising a thread structure configured to screw the further intermediate element to the gingiva former, and the thread structure being disposed apically of the clipping geometry.

* * * * *